Nov. 2, 1954  J. V. MARTIN  2,693,215
ELONGATED SPOKE TIRE
Original Filed Nov. 1, 1948  2 Sheets-Sheet 1
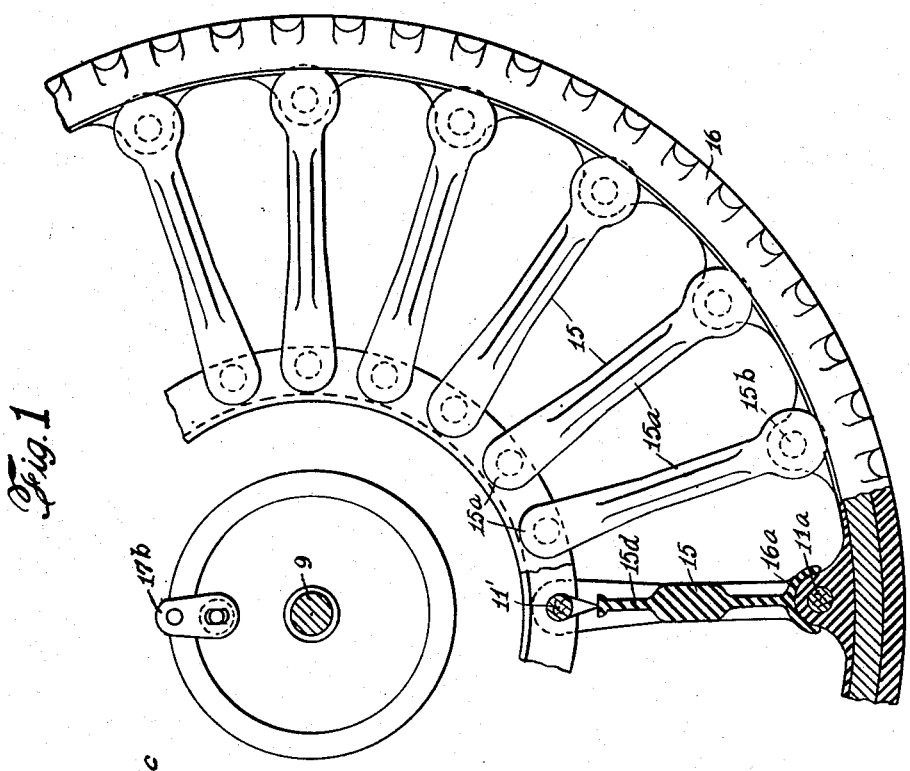
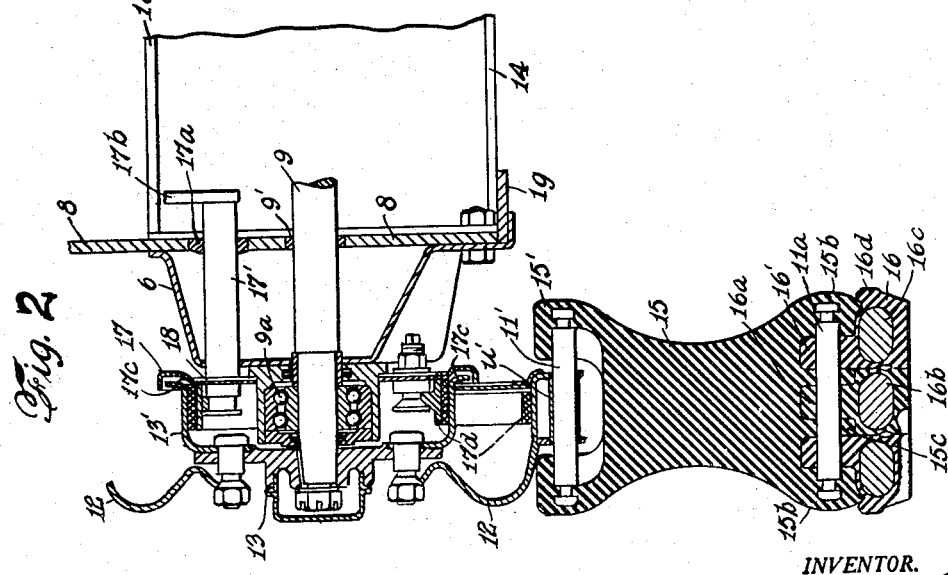
INVENTOR.
James V. Martin

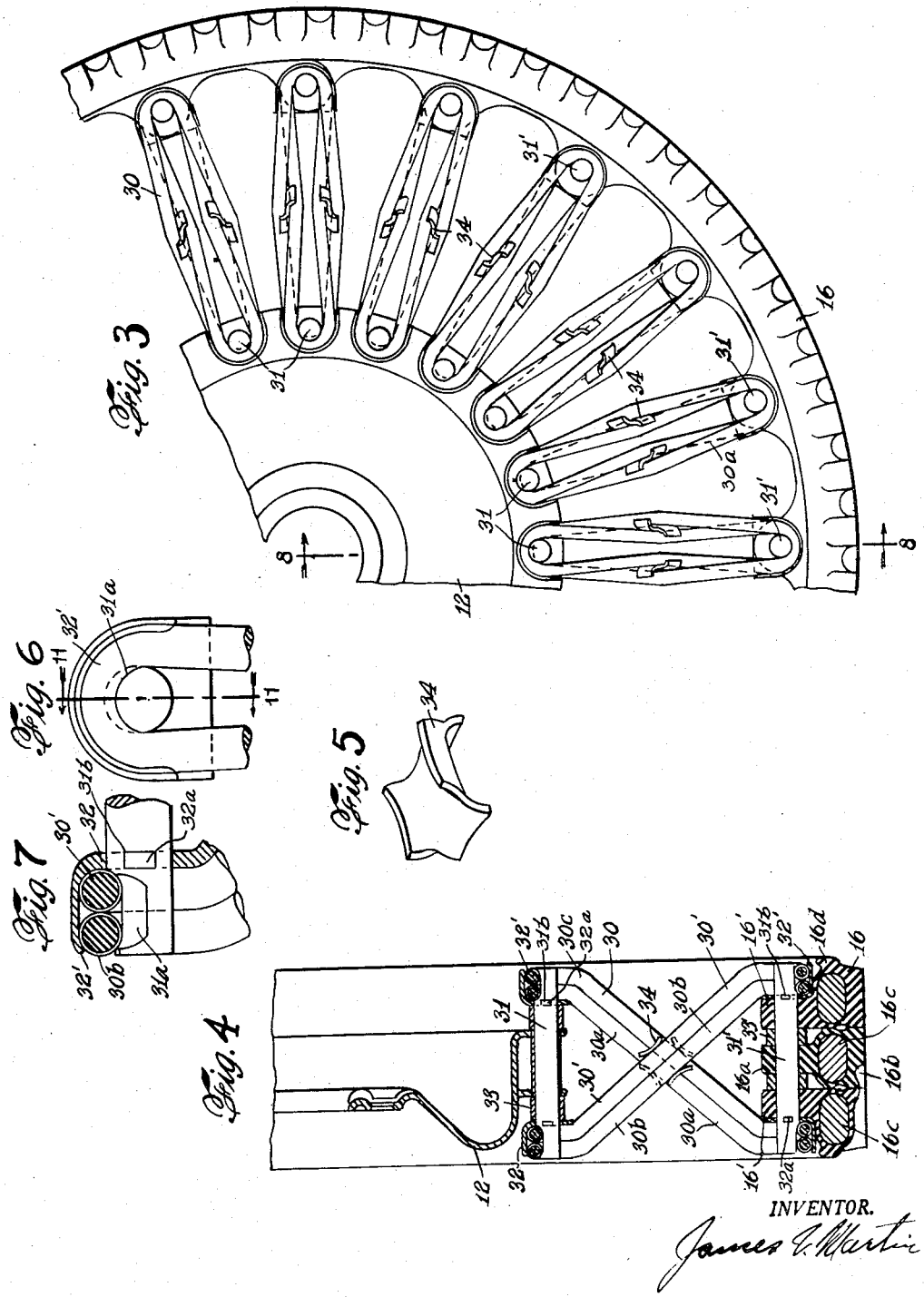

United States Patent Office 2,693,215
Patented Nov. 2, 1954

2,693,215

ELONGATED SPOKE TIRE

James V. Martin, Paramus, N. J.

Application August 1, 1951, Serial No. 239,764

7 Claims. (Cl. 152—7)

My invention relates to motor vehicles and aims to provide an increased range and better quality of springing for vehicles and to provide in the tire itself enough vertical range of springing to render steel springs and the pneumatic type tires unnecessary and also to provide enough vertical range of shock absorption to permit vehicles, airplanes and gun carriages to approach the ground at higher velocities by parachutes than is practicable with inflated type tires.

This is a division of my copending application for Motor Vehicle, Serial No. 57,751, filed November 1, 1948, and relates especially to those features of the aforesaid serial, disclosed in Figs. 5, 6, 7, 8, 9, 10 and 11, which in the present application are renumbered respectively from 1 to 7 inclusive.

I shall repeat for those skilled in the art those portions of the parent case which have special reference to the tires per se. Roadability experts have recognized the detrimental effects of the unsprung weights of a vehicle upon the sprung portions thereof and the patent art of the world shows thousands of efforts to transfer as much as possible of the unsprung category to the sprung classification. That this has been done imperfectly will appear from the following:

In virtually all of today's automobiles the vertically yieldable suspension means provided to compensate for road irregularities so that the passengers may travel on a horizontal path, as nearly as possible, is divided into two quite different kinds of springing. The main reliance is placed upon steel springs which provide between 2 and 4 inches of "down" movement for the body of the vehicle when statically loaded and the second kind of springing provided is the inflated air tire, called a pneumatic, which will afford approximately one inch of vertical travel for dynamic loads competent to utilize the full range of steel spring travel. Part of the vehicle, including the body, benefits by both types of suspension, while other heavy and important mechanical portions of the automobile, such as the rear differential banjo housing, axles, hubs, wheels, brakes, bearings and steering tie-rods do not get the benefit of the steel spring suspension, in fact the steel springs themselves are unsprung weight impinging dynamic loads upon the rear drive housing.

Both the rubber inflated tires and the steel springs give an undesirable and dangerous lateral motion to the vehicle called "side sway" and the pneumatic tires impart momentum (through the tennis ball principle of which they have all the bouncing characteristics) to the unsprung portions of the vehicle: This momentum is often propagated in synchronized rhythm through and by means of the steel springs to the sprung portions of the vehicle causing it to "leave the road."

Devices called shock absorbers have been invented to obviate the undesirable effects of steel springs and millions of dollars have been spent in almost futile efforts to mitigate the dangers of side sway; nevertheless, the bouncing and lateral weakness of the inflated type tire combine with the synchronized action and lateral weakness of the steel springs of modern automobiles to take control away from the driver at high speeds and add materially to the mounting toll of death and injury on our highways.

The limiting factor which has frustrated inventors in obtaining the vertical range of springing needed for comfortable riding has been lack of lateral resistance to side-sway. Countless efforts have been made to increase the vertical range of travel of the pneumatic tire. The most notable of these efforts was the introduction in the 1920's of the superballoon or "jumbo" tires. The lateral weakness of these tires caused their banishment from autos everywhere and brought a recognition in the art that inflated type tires have an inherent weakness laterally which prevents an increased vertical range of movement.

Into this state of the art the present invention intrudes offering to cancel out the steel springs entirely and to substitute rubber in tension and to make this form of springing available for all parts of a vehicle.

The elements of the present invention are already known in the art, see for example Patent Nos. 1,954,214 of April 10, 1934; 2,050,352 of August 11, 1936; 2,235,378 of March 18, 1941; 2,283,274 of May 19, 1942; and 2,492,433 of December 27, 1949. However in none of these prior cases was the total springing made available to all parts of the vehicle alike nor was sufficient lateral strength associated with the elastic spoke type tires to permit them a range of vertical travel equal to that disclosed in the present case which presents important changes for elongation of the spokes. Further objects of my invention will become apparent from the following description taken in connection with the accompanying drawings and the appended claims.

Fig. 1 is a side elevational view of my new tire as it would appear mounted on a demountable automobile disc type wheel.

Fig. 2 is a view in end elevation and partly in section showing my tire invention as attached to a vehicle drive wheel and taken along a vertical line through the center of the wheel shown in Fig. 1, and through the center of the bottom spoke of Fig. 1, showing use of the wheel rim as a brake drum.

Fig. 3 is a side elevational view of an alternative or elastic cord tire attached to the disc wheel of a vehicle.

Fig. 4 is an elevational view, partly in section, taken along the line 8—8 of Fig. 3.

Fig. 5 is a perspective view of the separator I employed to prevent chafing of the cords shown in Figs. 3 and 4.

Fig. 6 is a fragmentary view showing the wheel connection and attachment of the cords.

Fig. 7 is a view, partly in section, taken along the line 11—11 of Fig. 6.

Proceeding now, to the more detailed description of my invention, similar numerals will designate similar parts throughout the several views.

A typical disc wheel of an automobile which is demountably attached according to conventional practice to the wheel hub 13 is designated 12. This hub carries brake drum 13' while cross-bars 11' are press fitted into the U-shaped rim portion of the wheel 12 and, fitting snugly over the ends of these cross-bars, are the socket filled ends 15' of rubber tire spokes 15. These tire spokes differ materially from previous showings of elastic spokes, see patents enumerated above. Among the important differences my spokes in the present invention are considerably longer between the wheel 12 and the tread hoops 16 than they are wide, as seen in Fig. 2, and the diagonally cross ribs 15a (see Fig. 1) terminate, in the present case, in a spoke lug 15b enlarged at the expense of its inner spoke lug 15c. Also, to accommodate this change, which increases the lateral strength of the tire, the tread hoop lug 16' on the outermost tread hoops 16 are shifted from former practice at the centers of the hoop fillers to the inner parts of the hoops, see Fig. 2. The center hoop is indicated at 16b with usual stiffening filler 16c. An alternative brake is 17d with the wheel rim as brake drum.

In judging the length of a spoke it is important to have regard to the working length measured from the centers of the lock-pins 11a and the cross-bars 11'. The lock pins and cross bars are of the same shape and material so that they are interchangeable although attached to the wheel in different manner than to the tire tread.

The lock pins lock the spoke lugs 15b and 15c to the tread hoop lugs 16' and 16a. The cross-bars 11' are press fitted into tubes u' forming part of the wheel 12, U-shaped wheel rims. The wheel rim represents the outer limit of the wheel 12 and the spokes protruding therefrom are not spokes of a wheel, as some people might mistakenly suppose, but are tire spokes replacing substantially the side walls of pneumatic tires. Brake 17d can set on inside of wheel 12 because my tire runs cool and the tubes u' hold the spokes 15 away from the wheel.

The elongated spoke has a configuration, see Figs. 1 and 2, wherein the cross ribs 15a carry a greater proportion of the total spoke loads further toward the opposite lateral portions 15b from 15' than was possible in former showings and this transfers some of the almost vertical stresses in the spokes of former showings to the cross rib ends (see U. S. Patent 2,283,274), near the tread hoops and note should be taken that in the diagonally crossed ribs the lateral strength of my tire resides. The webs 15d become less important as the diagonal cross ribs take on more stresses. The tubes u' of the wheel rim not only serve as a press fit holding device, but strengthen the lock-bars centers against buckling. The cross ribs 15a blend into and cross each other at the center of spoke 15, like the showing of Fig. 2 in Patent 2,283,274, but cross at considerably different angles to produce an elongated spoke.

In order to prevent wear of my tire spokes where they are secured around the lock bars 11a and contact with the tread hoop lugs 16' and 16a I mold the cavities for reception of the lock pins smaller than the lock-pin itself, thus introducing rubber pressure enough to stop surging. Also the respective lugs are molded oversize so that when tightly held together by the button headed lock pins or lock-bars 11' they grip each other and prevent surging.

Referring to Figs. 3 to 7 inclusive, I disclose an alternative to elastic spokes, namely pre-tensioned elastic cords 30, comprising multiple rubber threads tightly bound together and kept under initial tension by two plies of brading in well known manner and more fully described in my former patents above mentioned.

In Figs. 3, 4 and 7, I show the elastic cords 30 made up as complete loops or rings 30' 30a, 30b and 30c in pairs occupying a somewhat analogous position in my tire to that of the diagonally cross ribs 15a in spokes 15. There are important differences however, for one thing the cords 30 constitute the entire yieldable connection between the wheel 12 and the tread hoops 16 and 16b, without webs, beads or lugs. Furthermore the rubber of the cords 30 is tensioned when fabricated into cords and also again when assembled around the plastic pins 31, which are press fitted into the U-shaped rim of the wheel 12, after the pattern shown in the wheel 12 for elastic spokes. The lugs 16' and 16a are locked by 31' to the loops 30 and lock-pin 31 is interchangeable with cross bar 31. It will be noticed that 31 and 31' lie inwardly of the curbing bead 16d. Also note that 31 and 31' are rounded at 31a, see Figs. 6 and 7, so that they provide a continuously rounded contact for cords 30 and retain same in place along with the overlip 32' of plastic guard or anti-chafing form 32. This guard serves as a smooth polished surface to prevent contact and chafing of the cord's outer brading on either the lugs 16' or the spacers 33 around 31. Other spacers 33 are around 31' and a plastic anti-friction separator 34 prevents contact between the cord loops 30 where they cross each other diagonally. It is difficult for anyone not acquainted with use of the elastic cords in such relationships to realize how sensitive they are to abrasion.

Contact of the cords in pairs with each other is not bothersome because they stretch together and the bradings move together, but when the cords cross if they so much as touch each other the brading fray readily and as soon as the first wrapper is broken the cord becomes practically worthless because it fails to hold the initial or manufactured tension in the rubber threads and also fails to keep the rubber protected from the sunlight and the atmosphere.

The plastic form shown in Fig. 5 is designed to keep the crossing cords apart and to present a polished smooth surface to the cords whereever they surge against the separator form. Also the design keeps itself in place without the aid of clamps.

In order to prevent the guard 32 from slipping off of or around the cross bars 31 I provide a shallow indenture 1b in each cross-bar and lock-pin in the location indicated by the parallelograms shown in Figs. 4 and 7. These parallelograms also represent the slightly protruding parts 32a located on the insides of each guard 32, so that when the guards are pressed home on the ends of each cross-bar and lock-pin they will remain in a fixed relation to each said pin. By pulling the cords 30 their diameter is lessened and they can readily be inserted into the spaces provided between the lips 32' of the guards and the ends of the cross-bars 31, thus locking the loops in place.

A loop 30a which is the outside loop of two cords near the tread hoops will be the inside loop around lock-pin 31 near the U-rim of wheel 12. There is a compactness beneficial lateral strength and measure of safety in arranging double cord loops rather than single loops as shown in my Patent No. 1,954,214 and the arrangement enables me to use the same wheel and same tread hoops for either spokes 15 or the loops 30. This is the first time in patent history that elastic cords have been associated with flexible tread hoops, which experience on the road has shown are necessary for success with a non-pneumatic tire. The use of separate flexible tread hoops accentuates the need for special shapes and surfaces to stop surging of the cord brading and the forms 30 and 32' also increase the lateral strength angle of the cords for the tire.

The operation of my invention will be apparent upon study of those skilled in the art. Contrasts with a pneumatic are the best approach, for example, an inflated tire deforms at the road contact so that the rolling radius on an average passenger car is slightly more than ½" less than the actual tire diameter. When the car is at rest the pressure against the road over the oval foot-print is equal to the static load on each tire, but this balance of forces, that of gravity and the road resistance, disappears when the car takes on the momentum due to travel in a horizontal direction.

When the inflated tire strikes a bump in the road whatever component of the blow is not absorbed by the deformation at the road passes in a short straight line into the axle of the car and thence through the steel spring action to the passengers. Nothing of this nature occurs in the elastic spoke or elastic cord type tires. No blow of any sort passes upward to the axle or the passengers from the ground because the spokes or cords between the axle and the ground are under tension: The recommended tension is 2.4 "G" for the tire, in other words, one inch of initial tension should be the assembled length added to each spoke over its molded length and this assumes that the strength of the fillers 16c plus the strength given these fibrous hoops by the initially tensioned spokes, which limit the departure of the hoops from true circles, will permit the spoke at the bottom of the wheel to contract one half inch under one static load and this leaves 1.4 range for dynamic loading such as would be imposed by a fairly severe bump in the road: The 1.4 "G" will contract the spokes between the road and axle the additional ½" and leave them still under tension at moment of impact. Thus for easy riding at normal speeds the new tire is vastly superior, but also for control of the car at speed over bumps the new tire is also superior because the inflated tire tries to "throw the car off of the road," and too often succeeds when combined with the momentum of the unsprung weight plus synchronized steel spring action. Rubber tension statitics indicate longer spoke life if all tension is not relaxed. The thoughtful world has simply closed its eyes to the vicious propensities of pneumatic tires which exert a pressure to separate the car from the road until the last ounce of weight is taken off the tire.

The new tire herein disclosed does not try to separate the tread from the road, on the contrary the loads on the axle whether light or heavy exert a steady influence pressing the tread hoops against the road: The deformity of my type tire is not at the road but internal in the tires particularly in the tension spokes above the level of the axle, although the tension spokes in the region above the ground and below the axle actually support the axle by retaining the physical properties of an arch curtate cycloidal through the departure of the hoops from the arc of a true circle. This fundamental difference accounts for the lack of bounce in my type tire as against pneumatics: In actual measured tests the loaded axle rebounded only 20% of the distance which resulted from a typical pneumatic, i. e. 80% less bounce in an elastic spoke type tire. Bouncing breaks contact with the road and induces skidding in pneumatics whereas the more constant road contacts of my tread hoops with the road reduces skidding. When the normal 2.4 "G" loadings are exceeded my type tire continues to carry all its loads in tension of the spokes, about 75% of all my spokes working to support the load. The spokes are designed to refuse compression loadings. Note the open space outward of each cross-bar 11' and the spokes are also designed to buckle readily at their centers rather than accept compression loadings. It will be evident that the cords 30 cannot be loaded in compression; so it follows that the world's easiest riding tire is that herein disclosed.

Two sets of interposed brakes and brake drums are shown in Fig. 2, both are of conventional internal expanding type friction brakes and the reason for such showing is unique because, for the first time in tire history, a really cool tire is shown for attachment to the vehicle wheel rim. Particularly the inner portions of the spokes 15 and the cords 30 never have shown any rise in temperature over that of the atmosphere regardless of the highest speeds continuously maintained. Where a special need exists for additional braking area both the conventional brake drum 13 and the special brake drum formed by the inside of the wheel rim and adapted for braking contact by the brake 17d may be used, but for ordinary use I prefer the simpler form of wheel and brake shown at 17d. This affords a larger diameter brake drum and saves the weight and cost of a special drum like 13'. With any other type of tire the heat associated with the conventional brake drum 13' would be too great for tire attachment directly to the drum as is done in Fig. 2 for tire spokes 15.

Changes in the details of my invention can be made without departing from the spirit and scope of my disclosure and what I claim is:

1. In a tire the combination of flexible tread hoops having tread hoop lugs and elastic spokes, each outer of said hoops having a curbing bead and each said spoke having diagonally crossed ribs terminating in greater outer spoke lugs, each of said outer hoops having lugs located along the inner portion of said hoop and means to connect the said spoke lugs to the said tread hoop lugs, whereby the outer lug of each said spoke may be of greater width transversely of the rotational plane than its inner lug and still lie within the outer face of the said curbing bead.

2. In combination with a vehicle wheel, a tire having flexible tread hoops each containing a stiffening filler and attachment lugs, elastic spokes connecting the said wheel to said hoops and each said spoke having multiple attachment lugs forming attachments for the said tread hoops, the outermost of said spoke lugs, one on each side of the spoke being of greater width than an adjacent spoke lug, and said tire hoop attachment lugs on the outside hoops off-set inwardly of said fillers to provide room for the greater width of the said outermost spoke lugs.

3. A combination according to claim 2 and diagonally crossed ribs leading from each wheel attachment to the said outermost spoke lugs on the opposite side, whereby greater lateral strength is obtained for the said tire.

4. A wheel, wheel fixtures and tire tread combination including anti-friction guards spaced apart at intervals along the rim of the said wheel, the said guards affixed to the ends of cross bars, means including elastic cords connecting the said guards and the said tire tread, tubes forming the wheel fixtures for the central portion of the said cross bars, whereby the central portions of the said cross bars are strengthened against buckling due to end loads on the said bars.

5. A vehicle wheel rim and flexible tire tread combination wherein the said rim supports endless elastic rings arranged in pairs as the yieldable connection between the said wheel rim and tire tread and anti-friction guards holding the rings in pairs at intervals along the outer margins of the said rim.

6. A vehicle wheel rim with cross bars and a flexible tire tread combination including pretensioned elastic rings forming the yieldable connection between the said wheel rim and tire tread, guards attached to the ends of the said cross bars to space the said rings at intervals along the lateral margins of the said rim, said wheel rim having a U-shape and forming the wheel connection for the central portions of the said cross bars, whereby the said cross bars are prevented from buckling near their centers and the said rings are held by said guards to stop them from coming off of the said cross bars when the said rings are relaxed.

7. A combination of wheel rim and flexible tire tread hoops, each said hoop containing a strengthening filler, interchangeable lock pins, some fastened at their central portions to the said rim and other lock pins held by lugs to the said hoops, the outermost of the said hoops on each side of the tire having an inwardly off-set lug relative to said hoop fillers and elastic means in tension interconnecting the diagonally opposite ends of the said wheel rim lock pins with the said hoop lock pins.

References Cited in the file of this patent

UNITED STATES PATENTS

| Number | Name | Date |
|---|---|---|
| 1,717,548 | Berg | June 18, 1929 |
| 2,028,207 | Hamilton | Jan. 21, 1936 |
| 2,282,638 | Boyer | May 12, 1942 |
| 2,283,274 | Martin | May 19, 1942 |
| 2,283,687 | Mercier | May 19, 1942 |
| 2,298,142 | Martin | Oct. 6, 1942 |
| 2,331,212 | Martin | Oct. 5, 1943 |
| 2,492,433 | Martin | Dec. 27, 1949 |

FOREIGN PATENTS

| Number | Country | Date |
|---|---|---|
| 539,743 | Great Britain | Sept. 23, 1941 |